(12) United States Patent
Hulse et al.

(10) Patent No.: US 8,249,083 B2
(45) Date of Patent: Aug. 21, 2012

(54) METHOD, APPARATUS AND COMPUTER PROGRAM FOR PROCESSING A MESSAGE USING A MESSAGE PROCESSING NODE

(75) Inventors: Brian Hulse, Winchester (GB); Callum Peter Jackson, Winchester (GB); Robert William Phippen, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 12/553,812

(22) Filed: Sep. 3, 2009

(65) Prior Publication Data
US 2010/0061382 A1    Mar. 11, 2010

(30) Foreign Application Priority Data

Sep. 5, 2008 (GB) .................................. 08163758.9

(51) Int. Cl.
*H04L 12/28* (2006.01)
*H04L 12/56* (2006.01)

(52) U.S. Cl. ....................................... 370/400

(58) Field of Classification Search .................. None
See application file for complete search history.

(56) References Cited

U.S. PATENT DOCUMENTS

| | | | | |
|---|---|---|---|---|
| 7,684,352 B2* | 3/2010 | Smith et al. | .................... | 370/255 |
| 2007/0230468 A1* | 10/2007 | Narayanan et al. | ............ | 370/392 |
| 2008/0225780 A1* | 9/2008 | McCormick et al. | ......... | 370/328 |

\* cited by examiner

*Primary Examiner* — Ayaz Sheikh
*Assistant Examiner* — Blanche Wong
(74) *Attorney, Agent, or Firm* — Steven E. Bach

(57) ABSTRACT

There is disclosed a method, apparatus and computer program product for processing a message using a message processing node. A message is received at the message processing node and at least one parameter value is extracted from the message. An attempt is made to select a node from a library of pre-configured nodes by using the at least one parameter value and the message is processed using the selected node. In attempting to select a node, an attempt is made to locate a pre-configured node that is appropriate for the message received and responsive to being unable to locate such a pre-configured node, a new node is configured using any parameter values extracted from the message.

9 Claims, 4 Drawing Sheets

METHOD, APPARATUS AND COMPUTER PROGRAM FOR PROCESSING A MESSAGE USING A MESSAGE PROCESSING NODE

FIELD OF THE INVENTION

The invention relates to computer message processing, and more particularly to the configuration of nodes in a messaging flow.

BACKGROUND OF THE INVENTION

An Enterprise Service Bus (ESB) is a flexible connectivity infrastructure for integrating applications and services. By way of example, an ESB typically performs the following:

Routing messages between services;

Converting transport protocols between requester and service;

Transforming message formats between requester and service; and

Handling business events from disparate sources.

An ESB system has two components. The first is a tooling component which enables a plurality of nodes to be wired together to form an overall message flow. The message flow conceptually describes the particular function of an ESB module being defined. For example a flow may be defined to model a situation in which messages are first received (by a receiving node), then transformed to a different format (by a transformation node), logged (by a logging node) and sent (by a sending node) to a message consumer.

The second component is a flow builder which uses the conceptual representation defined by a modelled message flow to create runtime artefacts and to order these appropriately. In order to instantiate a runtime artefact (node) into a message flow, the flow builder accesses code representing the node. The flow builder has access to a library of code representing various nodes that may be required for wiring into a message flow and selects from this library according to the underlying model.

Each runtime artefact is populated by the flow builder with parameter options specified by the model. For example, a logging artefact may take the properties "enabled" and "location" to define whether logging is enabled and where a message should be logged to. The enabled property (parameter) may take either "on" or "off" values and the location property takes one of a number of possible logging locations.

One example of such a system is the pairing of IBM's WebSphere® Integration Developer, which provides the ESB tooling support, and IBM's WebSphere® Enterprise Service Bus, which provides the runtime environment.

Such a system may be used to create a flow which requires similar function, represented by the same sequence and type of nodes in a flow, but with numerous routes using different configurations of some of the nodes in the flow. This requires a flow with filtering and branching logic to direct the flow to one of several hardwired flows each with a different variant of the configuration.

This situation is described with reference to FIGS. 1a and 1b. A filter node 10 receives a message (step 20). Filter node 10 is programmed to determine (in this example) whether logging of the message is required and to route the message to the appropriate node (A, B, C) in order to log the message to a suitable location. Thus at step 30 the filter node 10 examines the logging properties in the message. Such properties may be an "enabled" property (which specifies whether logging is on or off) and a "location" property (which specifies where a message should be logged to). Based on the information provided in the message an appropriate node is selected in order to actually do the logging (step 40). Thus if logging is set to on and database Y is specified as the location to which to log, node B is selected. Node B then performs the appropriate processing. Once the message has been directed towards the appropriate node, the message then continues along the appropriate message flow (e.g. B, B2, B3).

It should be appreciated that each of nodes A, B and C are the same type of node and perform the same sort of functionality. Each one is, however, slightly different than its peers because it requires a different configuration. In order to achieve the level of function required, the filter node will have to make a decision on the context of the flow, by examining the incoming message, and route based on that contextual information to the most appropriate node.

Thus it is possible to create the equivalent to a case statement in the C or Java programming language using messaging flows. The filter node provides the 'switch' logic and the subsequent nodes cater for the various combinations (cases).

This is a static programming model and results in some difficulties. The flow representation can be complex. Further if a new 'case' is required, then a new node (node D) would have to be configured and the switch (filter) logic would need updating to take account of new node. Configuring a node can be time consuming and costly. Typically, development of an industrial application will take place over an extended period, involving a number of roles. In this example, a Solution Designer would have to inform an Integration Developer of the additional case, runtime artefacts would have to be created or modified and passed to a System Administrator to install and test in the systems environment. In many cases the Integration Development may be done by a third party, with a more obvious cost impact.

SUMMARY OF THE INVENTION

According to a first aspect, there is provided a method for processing a message using a message processing node, the method comprising the steps of: receiving a message at the message processing node; extracting at least one parameter value from the message; attempting to select a node from a library of pre-configured nodes by using the at least one parameter value; and processing the message using the selected node, wherein the step of attempting to select a node comprises: attempting to locate a pre-configured node that is appropriate for the message received; and responsive to being unable to locate such a pre-configured node, configuring a new node using any parameter values extracted from the message.

The message processing node is described as a 'wrapper' node described in the detailed description below.

In one embodiment, the nodes in the library are indexed via a hash table. The hash function is performed on any extracted parameter values and the result of the hash function is used to access the hash table. According to one embodiment, any newly configured node is stored in the node library. The location of a node selected for a previous message may be remembered. In this embodiment it is determined whether the node selected for the previous message is appropriate for processing the current message and responsive to a positive determination, the previously selected node is selected using the remembered location.

In one embodiment, it is identified which of least one parameter value is to be extracted from received messages.

According to a second aspect, there is provided, an apparatus comprising a computer messaging system comprising memory and a processor. A computer-readable program code executable by the processor for processing a message using a message processing node is stored on the memory. The program code comprises: means for receiving a message at the message processing node; means for extracting at least one parameter value from the message; means for attempting to select a node from a library of pre-configured nodes by using the at least one parameter value; and means for processing the message using the selected node, wherein the means for attempting to select a node comprises: means for attempting to locate a pre-configured node that is appropriate for the message received; and means, responsive to being unable to locate such a pre-configured node, for configuring a new node using any parameter values extracted from the message.

The invention may be implemented as a computer program comprising program code adapted to perform the method of the first aspect.

This invention preferably allows data processing nodes to be parameterised dynamically, based on contextual information contained in or associated with the message that they process.

In one embodiment, an Integration Developer authors a flow containing 'dynamic dataflow nodes'. For a single 'dynamic dataflow node', the dynamic parameterisation is handled by a new runtime function, which causes multiple 'static' dataflow node instances to be created on demand to handle each case. When a new 'case' is encountered—i.e. a new set of dynamic properties occurs in a message being processed—a new instance of a 'static' node is created that is tailored to deal with that set of properties; this instance is held in memory such that, if the same case reoccurs, the same static instance can be reused; if a new case is encountered, then a new static instance is created and stored for later reuse.

The foregoing embodiment has two main advantages. First, the mechanism provides an abstraction to the Integration Developer of dynamic parameterisation, without the need for individual data processing node implementations to be modified to allow dynamic parameterisation themselves. Second, it is efficient in term of processing, because the processing overhead for initialising a dataflow processing node is incurred only once for each set of parameters.

BRIEF DESCRIPTION OF THE DRAWINGS

Preferred embodiments of the invention will now be described, by way of example only, and with reference to the following drawings.

DETAILED DESCRIPTION

A preferred embodiment of the present invention will be described with reference to FIGS. 2, 3, 4 and 5.

Instead of a filter (switch) node and a plurality of hardwired branches (case) nodes, one single node 100 is preferably provided. This node is understood by the Integration Developer to be 'dynamically parameterised'; in the preferred embodiment it acts as a wrapper into which a runtime instance of a suitably configured node can conceptually be loaded. The wrapper node is sensitive to contextual information, in the form of the messages passing through the flow. The wrapper node is operable to access a library 110 of previously configured nodes 130, one of which is selected dependent upon information contained in a received message. Thus instead of the message flow having hardwired branches, an appropriate node is (conceptually) loaded into the message flow dynamically.

The library may be pre-populated by an administrator (and continue to be populated during the operation of the system) or may start off empty and be populated during operation of the system.

Figure 1A:
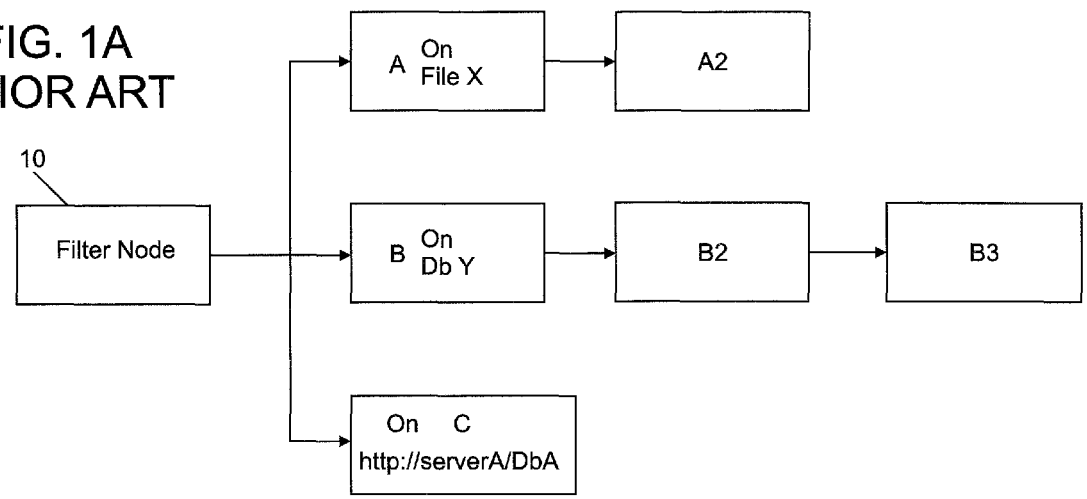
FIGS. 1a and 1b illustrate a static programming model.
Figure 1B:
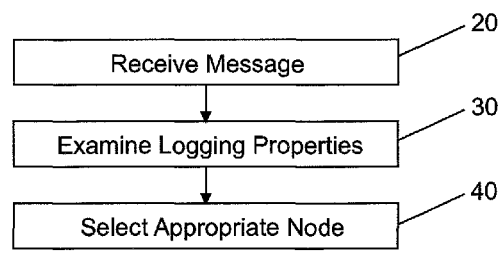
Figure 2:
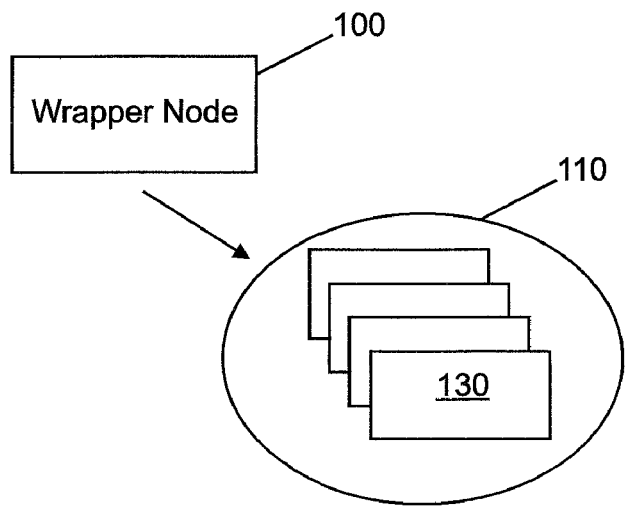
FIGS. 2, 3, 4 and 5 illustrate the componentry and processing of a method, apparatus and program product for processing a message using a message processing node according to embodiments of the present invention.
Figure 3:
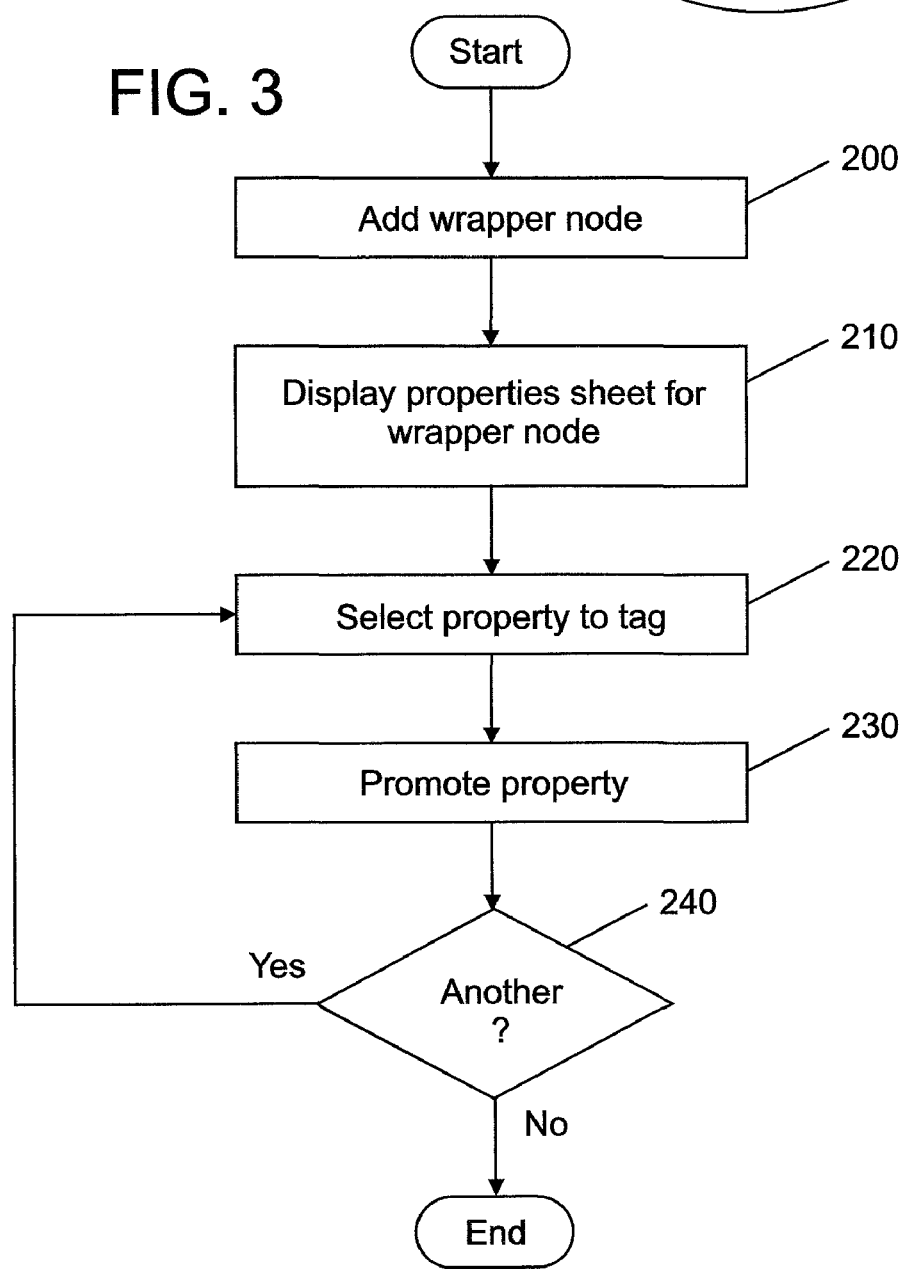

FIG. 3 illustrates, in accordance with one embodiment, the processing which enables an integration developer to indicate which properties in a message (contextual information) the wrapper node should be sensitive to (i.e. look for).

A modelling tool such as IBM's WebSphere Integration Developer (WID) allows an integration developer (ID) to model a message flow. An ID can drop nodes onto a blank (modelling) canvas and create links between them. This is a standard technique provided by many modelling tools.

In accordance with a sample embodiment, a new wrapper node 100 is provided. When this is added (step 200) to the modelling canvas, a properties sheet is displayed to the user at step 210. The properties sheet describes all the properties (parameters) that the wrapper node uses during the processing of a message. The ID can then select the properties for which processing is to be dynamically loadable. In this way, the wrapper node is aware of which properties to look for in a message (steps 220, 230, 240). Although this is not specifically shown, when a property is tagged, the ID may also indicates to the wrapper node 100 where that property can be found in the message. This may be done by specifically pointing towards a particular part of the message. Alternatively, a property may resolve to an alias which can then be searched for in a newly received message.

Figure 4:
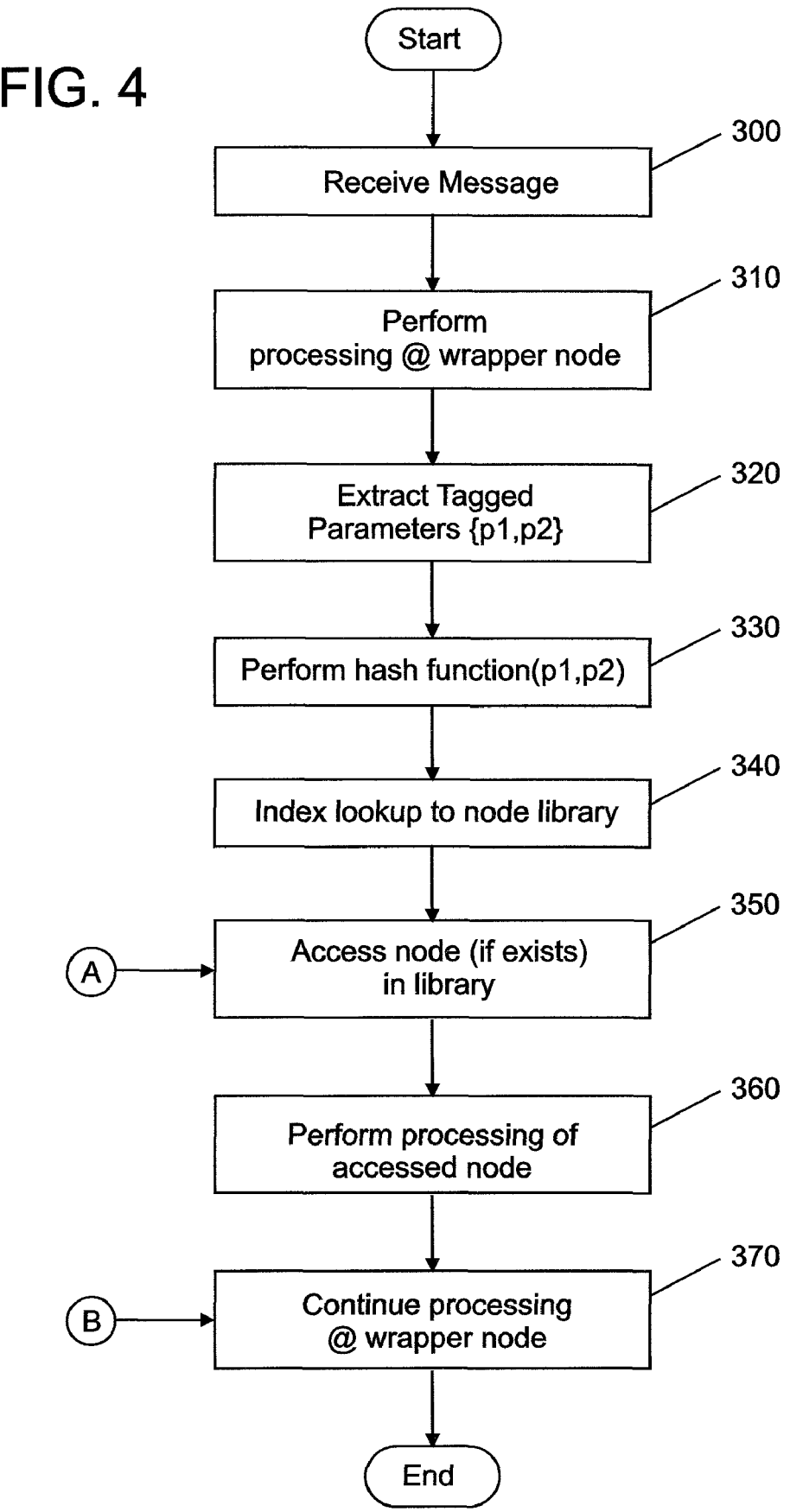
Figure 5:
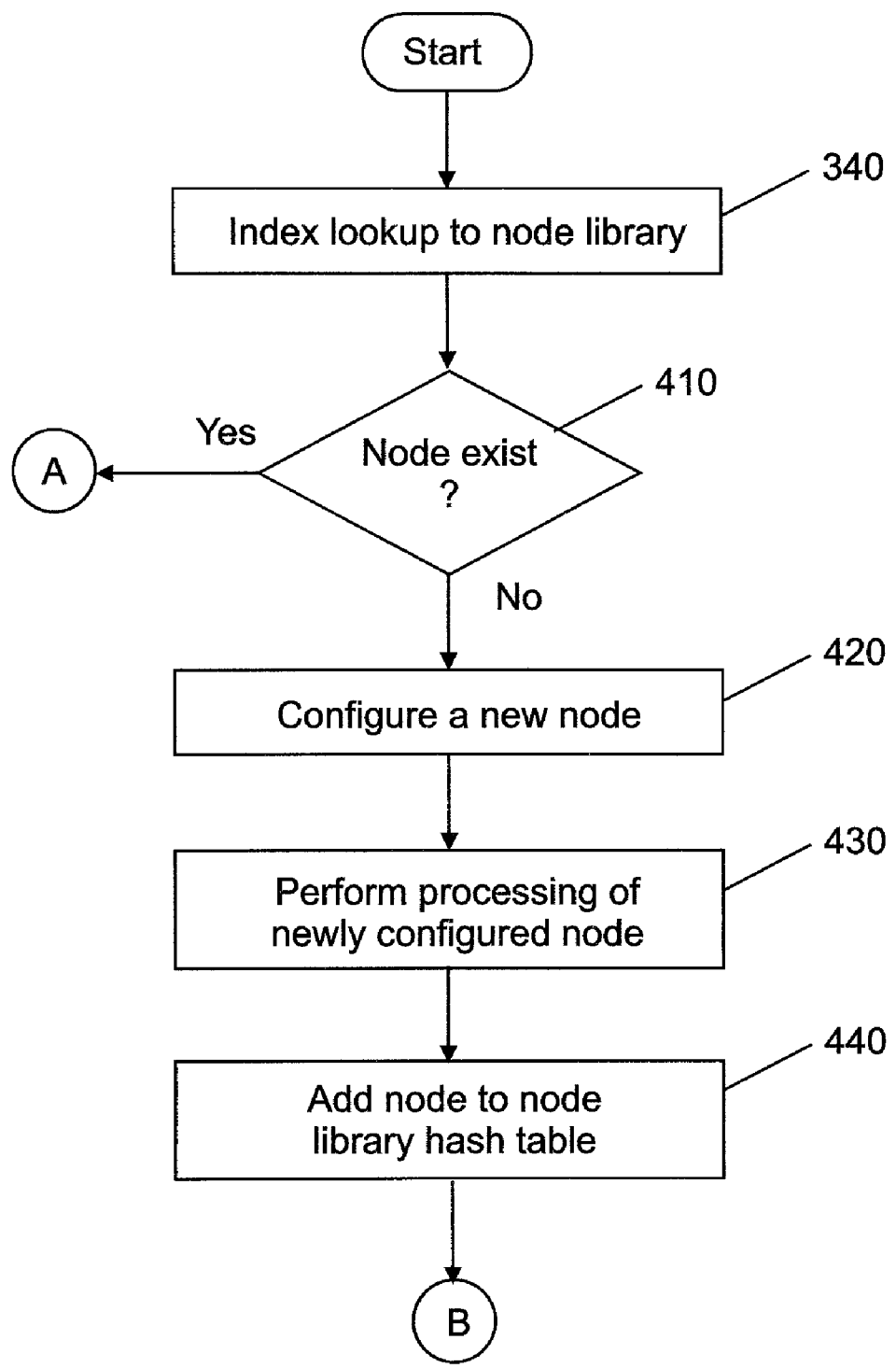

Once properties have been tagged as appropriate, the wrapper node is ready to receive messages as part of a message flow. As illustrated in FIG. 4, a message is received by the wrapper node 100 at step 300. The wrapper node 100 may have some basic processing to perform (step 310). At step 320, the wrapper node extracts the values associated with tagged parameters from the message (step 320). The extracted values are used to access the node library 110. As discussed, the node library comprises a repository of previously configured nodes 130. These are preferably stored in a cache and are accessible via a hash table. Thus a hash function (f) is performed on a combination of the extracted parameter values (p1, p2) at step 330. The output of function f is used to identify an appropriate previously configured node at step 340. Then, the resulting output of function f is used to access an appropriate previously configured node from within the cache (step 350). In other words, the wrapper node makes a call out to an appropriate node in the node library and the processing of this node is performed (step 360)—the message is passed to the node for processing. Processing can then return to the wrapper node to continue with any additional processing (step 370) before the next node in the flow is accessed.

The system holds a pointer to the node that has most recently been accessed. When the next message is received, the hash function is applied to the parameters extracted from the message to see if the currently loaded instance applies. If it does then the pointer can be used to access the same node again.

It should be appreciated that an appropriate previously configured node may not exist within the node library. Thus the processing of step 340 is expanded upon with reference to FIG. 5.

At step 340, an attempt is made to locate a previously configured node that is appropriate for the message being processed. At step 410, it is determined whether such a node exists. If it does, then processing continues as previously explained with reference to FIG. 4. If such a node does not exist, then the node is created on-the-fly at step 420. In other words, technology already provided by the flow builder is extended such that an appropriate node is selected and initialised. Normally the initialisation information would come entirely from the model. In this instance however, information in the message is used to initialise the retrieved node. This will not be described in any more detail since the technique for initialising a node is well known.

The processing of the newly initialised node is then performed at step 430 and then the new node is added to the library of nodes at step 440. The new node is indexed appropriately so that it is accessible in the future.

Thus a system has been described which dynamically loads in a previously configured node (if that node exists) on a per message basis. Configuring (initialising) a node can be expensive (time consuming). For example, it may require parsing data into a particular format. The present invention, in accordance with a preferred embodiment, enables previously configured nodes to be stored for future use. The system may start with a set of previously configured nodes or nodes may be created on-the-fly (i.e. when a node is found not to exist) and added to the library.

The exemplary wrapper node is a logging node but no limitation is intended. A wrapper node may be used for other functions.

As discussed, typically, development of an industrial application will take place over an extended period, involving a number of roles. In this example, the Solution Designer would have to inform the Integration Developer of the additional node, runtime artefacts would have to be created and passed to the System Administrator to install and test in the systems environment. In many cases the Integration Development may be done by a third party, with a more obvious cost impact.

This invention, in accordance with a preferred embodiment, removes the need for these steps since the runtime system dynamically reacts to contextual information in a message passing through the flow; so long as the logical processing steps required are the same, then this solution allows each step of the processing to be customized dynamically, without any requirement for intervention by the user of the flow builder.

It should be appreciated that whilst the term message has been used throughout, this term is intended to encompass additional contextual information that may be associated with the message. Thus a node may be selected from the cache or create based on such contextual information. An example of contextual information might be a message category.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer-readable medium may be any apparatus that can contain or store and communicate the program for use by or in connection with the instruction execution system, apparatus, or device.

The foregoing method may be realized by a program product comprising a machine-readable media having a machine-executable program of instructions, which when executed by a machine, such as a computer, performs the steps of the method. This program product may be stored on any of a variety of known machine-readable media, including but not limited to compact discs, floppy discs, USB memory devices, and the like.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

The preceding description and accompanying drawing are intended to be illustrative and not limiting of the invention. The scope of the invention is intended to encompass equivalent variations and configurations to the full extent of the following claims.

The invention claimed is:

1. A computer-implemented method for processing a message using a message processing node, the method comprising the steps of:
   receiving a message at the message processing node;
   extracting at least one parameter value from the message;
   attempting to select a node instance from a library of pre-configured node instances indexed via a hash table by using the at least one parameter value; and
   processing the message at the message processing node using the selected node instance,
   wherein the step of attempting to select a node instance comprises:
   attempting to locate a pre-configured node instance that matches the at least one parameter value extracted from the message received by performing a hash function on any extracted parameter values and using the result of the hash function to access the hash table; and
   responsive to being unable to locate such a pre-configured node instance, configuring a new node instance using any parameter values extracted from the message; and
   wherein the location of a node instance selected for a previous message is remembered and the step of attempting to select a node instance comprises:
   determining whether the node instance selected for the previous message is appropriate for processing the current message; and
   responsive to a positive determination, accessing the previously selected node instance using the remembered location.

2. The method of claim 1, further comprising:
   storing the newly configured node instance in the library of pre-configured node instances.

3. The method of claim 1, further comprising the step of:
   identifying which at least one parameter value is to be extracted from received messages.

4. An apparatus for processing a message using a message processing node, the apparatus comprising:
   a processor; and
   a memory, the memory having stored thereon a program of instruction executable by the processor, the program of instruction comprising:
   means for receiving a message at the message processing node;
   means for extracting at least one parameter value from the message;

means for attempting to select a node instance from a library of pre-configured node instances by using the at least one parameter value; and means for processing the message using the selected node instance, wherein the means for attempting to select a node instance comprises:

means for attempting to locate a pre-configured node instance that matches the at least one parameter value extracted from the message received; and means, responsive to being unable to locate such a pre-configured node instance, for configuring a new node instance using any parameter values extracted from the message;

wherein the location of a node instance selected for a previous message is remembered and wherein the means for attempting to select a node instance comprises:

means for determining whether the node instance selected for the previous message is appropriate for processing the current message; and means, responsive to a positive determination, for accessing the previously selected node instance using the remembered location.

5. The apparatus of claim 4, wherein the pre-configured node instances in the library are indexed via a hash table and wherein the means for attempting to select a node instance from a library of nodes comprises:

means for performing a hash function on any extracted parameter values; and means for using the result of the hash function to access the hash table.

6. The apparatus of claim 4, further comprising:

means for storing the newly configured node instance in the library of pre-configured node instances.

7. The apparatus of claim 4, further comprising:

means for identifying which at least one parameter value is to be extracted from received messages.

8. A computer program product comprising a tangible computer-readable device having encoded thereon computer-readable program code for processing a message using a message processing node, the program code comprising:

program instructions for receiving a message at the message processing node;

program instructions for extracting at least one parameter value from the message;

program instructions for attempting to select a node instance from a library of pre-configured node instances by using the at least one parameter value; and program instructions for processing the message using the selected node instance, wherein the program instructions for attempting to select a node instance comprise:

program instructions for attempting to locate a pre-configured node instance that matches the at least one parameter value extracted from the message received;

program instructions for, responsive to being unable to locate such a pre-configured node instance, configuring a new node instance using any parameter values extracted from the message; and program instructions for storing the newly configured node instance in the library of pre-configured node instances;

wherein the pre-configured node instances in the library are indexed via a hash table, wherein the location of a node instance selected for a previous message is remembered, and wherein the program instructions for attempting to select a node from a library of nodes comprise:

program instructions for performing a hash function on any exacted parameter values; and;

program instructions for using the result of the hash function to access the hash table;

program instructions for determining whether the node instance selected for the previous message is appropriate for processing the current message; and program instructions for, responsive to a positive determination, accessing the previously selected node instance using the remembered location.

9. The computer program product of claim 8, wherein the program code further comprises:

program instructions for identifying which at least one parameter value is to be extracted from received messages.

* * * * *